H. J. GAISMAN.
SAFETY RAZOR.
APPLICATION FILED APR. 6, 1909.
1,121,916.
Patented Dec. 22, 1914.
2 SHEETS—SHEET 1.
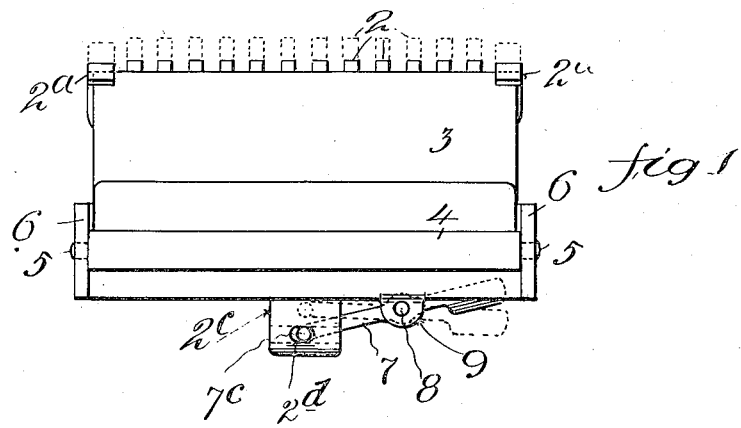
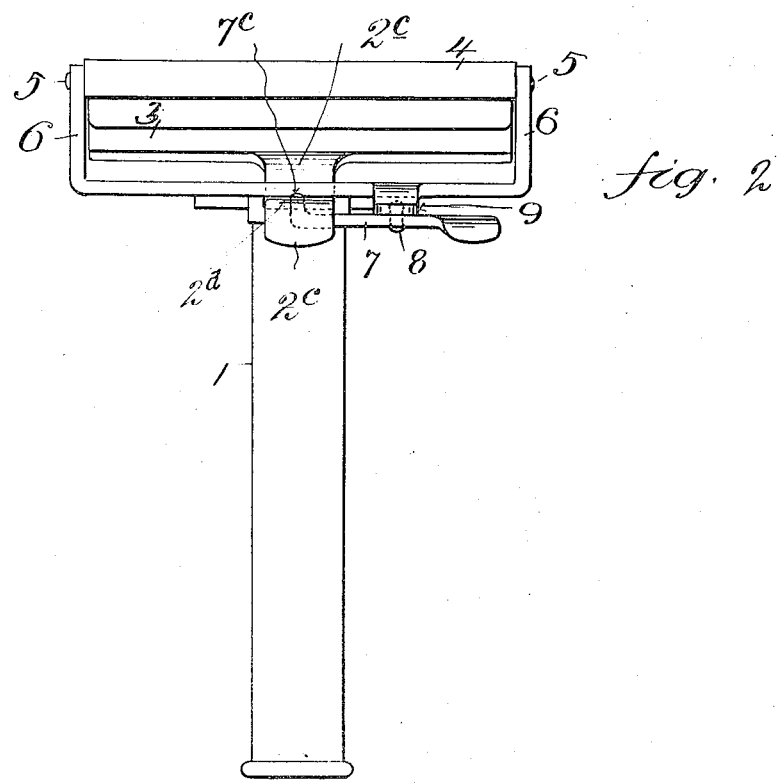
Witnesses:
Inventor
Henry J. Gaisman.

H. J. GAISMAN.
SAFETY RAZOR.
APPLICATION FILED APR. 6, 1909.
1,121,916.
Patented Dec. 22, 1914.
2 SHEETS—SHEET 2.
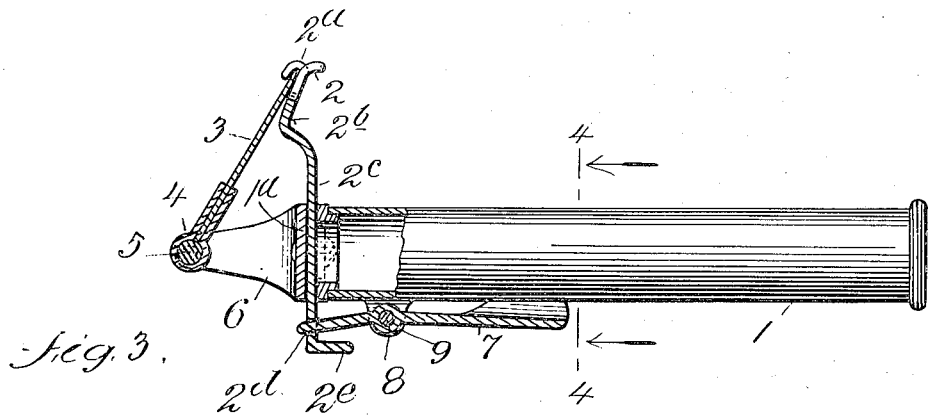
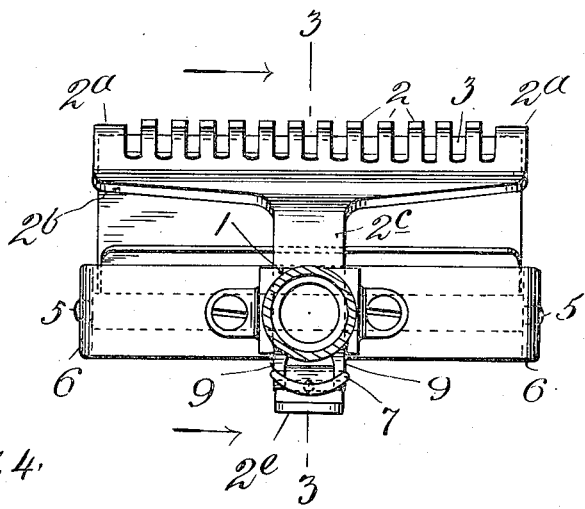

UNITED STATES PATENT OFFICE.

HENRY J. GAISMAN, OF NEW YORK, N. Y., ASSIGNOR TO AUTO STROP COMPANY, OF NEW YORK, N. Y., A CORPORATION OF NEW YORK.

SAFETY-RAZOR.

1,121,916.	Specification of Letters Patent.	Patented Dec. 22, 1914.

Application filed April 6, 1909. Serial No. 488,183.

*To all whom it may concern:*

Be it known that I, HENRY J. GAISMAN, a citizen of the United States, and resident of New York city, borough of Manhattan, in the county of New York and State of New York, have invented certain new and useful Improvements in Safety-Razors, of which the following is a specification.

My invention relates to improvements in safety razors, and the object of the invention is to provide improved means for manipulating the parts that hold the blade in position.

In carrying out my invention I provide clamping hooks or lugs to hold the blade between opposite edges, a handle, and a movable member movably connected with the hooks or lugs adapted to be operated by the thumb or finger to actuate the hooks or lugs to grip or release the blade.

My invention also comprises the novel details of improvement and combinations of parts that will be more fully hereinafter set forth and then pointed out in the claims.

Reference is to be had to the accompanying drawings forming part hereof, wherein, Figure 1 is a plan view of a safety razor embodying my invention, Fig. 2 is a rear view thereof, Fig. 3 is a partially sectional side view illustrating a modification, the section being taken substantially on the plane of the line 3, 3, in Fig. 4, and Fig. 4 is a cross section on the plane of the line 4, 4, in Fig. 3.

Similar numerals of reference indicate corresponding parts in the several views.

In the drawings the numeral 1 indicates a suitable handle, that supports the member $2^c$ having at its end a guard 2 for the edge of blade 3, which may have one or more cutting edges. In the form shown blade 3 is mounted in a suitable holder 4 pivotally supported, as by shaft 5, in a frame or head portion 6 secured to handle 1. The guard 2, shown carrying the hooks or lugs $2^a$ that engage and hold the blade in shaving position upon the guard, is adapted to move relatively to handle 1, transversely of the axis thereof, whereby relatively movable clamping jaws are provided. The hook supporting portion $2^b$ is shown provided with the member or projection $2^c$ extending across the handle and guided to slide in a suitable guideway $1^a$ between handle 1 and head 6.

At 7 is a movable member or lever for operating the blade holding lugs $2^a$, which lever is shown pivotally supported upon handle 1 by a pivot 8 passing through one or more ears or lugs 9 extending from the head part 6 in Figs. 1 and 2, while in Figs. 3 and 4 the ears or lugs 9 extend from the handle.

In Figs. 1 and 2 lever 7 is disposed horizontally with respect to the axis of handle 1, and at one end said lever is pivotally connected with extension $2^c$. I have shown the bent end $7^c$ of lever 7 passing through a suitable opening $2^d$ of extension $2^c$, the opposite end of lever 7 being suitably shaped and located in position to be manipulated. Said projection $2^c$ adjacent the handle is shown provided with a bent thumb piece $2^e$. By pushing the thumb piece $2^e$ or projection $2^c$ the blade engaging hooks or lugs $2^a$ may be pushed away from the edge of the blade so that the latter is free to be swung up or removed from its holder 4, and when blade 3 is placed in its holder and swung down in operating position with respect to the hooks or lugs $2^a$ then the outer end of lever 7 may be pushed toward handle 1 which will draw the hooks or lugs $2^a$ toward the blade edge to hold the blade in proper shaving position with respect to the guard.

In Figs. 3 and 4 the lever 7 is arranged vertically with respect to the axis of the handle or parallel therewith, the upper end of lever 7 passing through opening $2^d$ in extension $2^c$. By pushing on extension $2^c$ the hooks or lugs $2^a$ will release the blade, and by pushing on the lower end of the lever said hooks or lugs will be drawn back to hold the blade in shaving position respecting the guard.

The lower end of lever 7 may be pulled out or its upper end pushed toward the handle to cause lugs or hooks $2^a$ to release the blade.

Changes may be made in the details of construction and arrangements set forth within the scope of the appended claims without departing from the spirit of the invention.

Having now described my invention what I claim is:—

1. In a safety razor, the combination of a frame, a handle connected therewith, a blade, blade holding lugs, means to movably support said lugs, and a lever pivotally supported by the frame and extending transversely of the handle and having one end pivotally connected with said means that support the lugs and the other end located in position to be manipulated.

2. In a safety razor, the combination of a blade, a guard therefor, a frame, means for movably connecting the guard to the frame, a blade holder having relatively movable clamping jaws, means on the guard for receiving a cutting edge of a blade and holding said blade in fixed position, a handle on the frame, a lever for moving the guard, and means on the frame pivotally supporting the lever.

3. In a safety razor, the combination of a blade, a guard therefor, blade holding lugs on said guard a frame in which the guard is slidable, a blade holder having relatively movable clamping jaws between which the blade is insertible, a handle extending from the frame, a lever, an extension on the guard having a slot for receiving the lever, means for pivotally mounting the lever on the frame longitudinally of said frame and transversely of the handle.

4. In a safety razor, the combination of a blade, a guard therefor, a frame, a blade holder having relatively movable clamping jaws, a handle extending from the frame, a member associated with the guard and provided with a slot, a lever having one end operable in the slot, and means for pivotally mounting the lever.

5. In a safety razor, the combination of a frame, a blade holder carried by the frame, a blade therein, a guard for the blade, a handle projecting from the plane of the lower face of the frame, a lever, means on the frame for pivotally mounting the lever, and means on the guard engaged by the lever whereby the lever communicates motion to the guard.

6. In a safety razor, the combination of a handle, a frame thereon, a blade holder pivotally carried by the frame, a blade, a movable guard for the blade edge, means forming a part of the frame constituting a guide for the guard, a lever, means for connecting the lever to the guard for moving the guard, an ear on the frame, and a pivotal pin in the ear on which the lever is oscillatable.

7. In a safety razor, the combination of a handle, a frame, a blade holder pivotally connected thereto, a movable guard, guides for the guard comprising a portion of the frame, a guard extension having a slot therein, a lever having one end operable in the slot, and means for pivotally supporting the lever.

8. In a safety razor, the combination of a handle, a frame thereon, a movable guard for a blade, means comprising a portion of the frame for guiding the guard, a lever, means for mounting the lever parallel to the frame, and an extension on the guard engaged by the said lever whereby the movement of the lever is communicated to the guard.

Signed at New York city, in the county of New York, and State of New York, this 5th day of April, A. D. 1909.

HENRY J. GAISMAN.

Witnesses:
MAX DAVIS,
T. F. BOURNE.